US008788619B2

(12) United States Patent
Karn et al.

(10) Patent No.: US 8,788,619 B2
(45) Date of Patent: Jul. 22, 2014

(54) METHOD AND INFRASTRUCTURE FOR ACCESSING REMOTE APPLICATIONS THROUGH A SECURE FIREWALL

(75) Inventors: Holger Karn, Aidlingen (DE); Torsten Steinbach, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 2842 days.

(21) Appl. No.: 11/422,300

(22) Filed: Jun. 5, 2006

(65) Prior Publication Data

US 2007/0165606 A1  Jul. 19, 2007

(30) Foreign Application Priority Data

Oct. 25, 2005  (EP) .................................... 05109935

(51) Int. Cl.
*G06F 13/00* (2006.01)
*H04L 29/08* (2006.01)
(52) U.S. Cl.
CPC ............................. *H04L 29/08072* (2013.01)
USPC ...................................................... 709/218
(58) Field of Classification Search
CPC ..... H04L 29/06; G06F 17/3089; G06Q 10/10

USPC .......................................................... 709/218
See application file for complete search history.

(56) References Cited

U.S. PATENT DOCUMENTS

| 2001/0056547 | A1  | 12/2001 | Dixon |
| 2004/0088409 | A1* | 5/2004  | Braemer et al. ............... 709/225 |
| 2004/0148328 | A1* | 7/2004  | Matsushima .................. 709/200 |

* cited by examiner

*Primary Examiner* — Robert B Harrell
(74) *Attorney, Agent, or Firm* — Prentiss Johnson;SVL IP Law Edell, Shapiro & Finnan, LLC

(57) ABSTRACT

A method, computer program product, and infrastructure for accessing a remote application running on a system A by a system B, each being connected to an open network and located behind a firewall, are provided. The method, computer program product, and infrastructure provide for system A sending a first HTTP request to system B via the open network, blocking the first HTTP request from system A till an application request is available at system B, system B sending an HTTP response to system A via the open network, the HTTP response comprising the application request, system A processing the application request from system B to generate an application response, system A sending a second HTTP request to system B via the open network, the second HTTP request comprising the application response, and blocking the second HTTP request from system A till another application request is available at system B.

35 Claims, 2 Drawing Sheets

METHOD AND INFRASTRUCTURE FOR ACCESSING REMOTE APPLICATIONS THROUGH A SECURE FIREWALL

CROSS-REFERENCE TO RELATED APPLICATIONS

This application claims benefit under 35 U.S.C. §119 of European Patent Application No. EP05109935, filed on Oct. 25, 2005, which is hereby incorporated by reference in its entirety for all purposes as is fully set forth herein.

FIELD OF THE INVENTION

The present invention relates to remote applications, and more particularly to a method and infrastructure for accessing a remote application.

BACKGROUND OF THE INVENTION

Most computer applications require services, such as upgrading the software level and monitoring the application health. Besides these tasks, a service provider has to be at a customer's disposal in case of questions concerning an application. Specifically, the server provider may have to deal with unforeseen problems caused by applications running on the customer's system. In most of these cases, the service provider has to collect information about the configuration and workload of applications and requires access to those applications to carry out the necessary services.

As it is of general interest to work as fast and as cheap as possible, both the customer and the service provider, appreciate the ability to remotely access applications running on the customer's system, provided that the customer is in full control of the remote access.

Nowadays, most computer systems are connected to an open network, such as the Internet. Therefore, one of the goals is to provide remote access via the open network. However, current solutions have problems relating to implementation and security on the remote side, which is usually the customer's side, as well as on the local side, which is usually the service provider's side.

According to one current solution, a Virtual Private Network (VPN) connection is created to access a remote application behind a firewall and to pass data through the firewall. However, this requires Transmission Control Protocol/Internet Protocol (TCP/IP) communication ports to be open at the firewall. Most customers will not allow the necessary ports to be open at their firewall. Thus, the VPN-solution is usually not an option.

Another known solution is the use of HTTP tunneling. HTTP tunneling allows a system A to access applications or services on a system B through the firewall of system B. However, HTTP tunneling opens a connection in one direction only. In other words, it does not allow system B to access an application or service on system A through the firewall of system A. Thus, if system B wanted to access an application or service on system A through the firewall of system A, an HTTP tunneling gateway also has to be installed in the firewall of system A. Once again, most companies will not allow such tunneling because it opens new entries into the company's intranet.

Accordingly, the object of the present invention is to provide a method and an infrastructure for accessing a remote application running on a system A by a system B via an open network without needing to open additional entries into the firewall of system A.

SUMMARY OF THE INVENTION

According to one embodiment of the present invention a method is provided for accessing a remote application running on a system A by a system B, wherein system A and system B are connected to an open network (e.g. the Internet), and wherein system A and system B are each located behind a firewall. The method provides for system A sending a first HTTP request to system B via the open network, blocking the first HTTP request from system A till an application request is available at system B for transfer to system A, system B sending an HTTP response to system A via the open network, the HTTP response comprising the application request, system A processing the application request from system B to generate an application response, system A sending a second HTTP request to system B via the open network, the second HTTP request comprising the application response, and blocking the second HTTP request from system A till another application request is available at system B for transfer to system A.

The invention is based on the idea of logically reversing the direction of HTTP requests for an overlaying application request wherein the overlaying application request seeks to access a remote application. Thus, even if there are two firewalls between system A and system B, an application at system A can be accessed from system B without opening the firewall of system A.

In addition, the remote side, represented y system A, is always in full control of the communication with system B. First, it is system A which initiates the communication by sending a first HTTP request to system B. System A can then allow or deny each access by system B through processing of the corresponding application request received from system B. Moreover, system A is able to stop the whole communication at any time by sending a final HTTP request to system B or by ending the HTTP communication.

According to another embodiment of the present invention, the remote system A is able to specify an application X to be accessed by system B with the first HTTP request. Each HTTP request from system A concerning application X is then blocked till an application request concerning application X is available at system B. This assures that system B does not see anything else on the remote side other than application X, which has been explicitly specified by system A.

The protection of the remote side can be further increased by limiting system B to only those operations that are explicitly approved by system A. For instance, all operations allowed by system A when processing an application request from system B can be set forth in advance in a definition. In this case, processing an application request from system B comprises allowing or denying any operation required by the application request based on the definition. Moreover, HTTP communication between system A and system B can be encrypted to guarantee the privacy of the communication.

The proposed mechanism for accessing a remote application allows a service provider to operate as if application X is a local application and to perform operations, such as regular monitoring and performance analysis on a customer's application and collecting necessary information about configuration and workload of the application, on application X when the customer opens a problem ticket against the application. The invention, however, is not limited to the above mentioned usage examples and allows performance of other operations on application X as if it was a local application.

A further object of the present invention is to provide an infrastructure for accessing a remote application and for performing the method described above. The implementation of the present invention requires infrastructure means at the remote side, hereinafter referred to as system A, as well as infrastructure means at the block side, hereinafter referred to as system B.

Provided that system A and system B are connected to an open network, and system A and system B are each located behind a firewall, in one embodiment, the infrastructure at the remote side comprises means for sending HTTP requests from system A to system B via the open network, means for receiving HTTP responses from system B to system A via the open network, means for processing HTTP responses from system B to extract application requests and to forward the application requests to system A, and means for generating HTTP requests comprising application responses generated by system A.

In one implementation, the infrastructure at the local side includes means for receiving HTTP requests from system A to system B via the open network at the firewall of the local side, means for sending HTTP responses from system B to system A via the open network, means for listening for application requests from system B concerning applications running on system A, means for blocking HTTP requests from system A to system B till an appropriate application request is available from system B, means for generating HTTP responses comprising application requests from system B, and means for processing HTTP requests received from system A to extract application responses and to forward the application responses to system B.

The infrastructure at the remote side may also comprise means for generating HTTP requests specifying an application X to be accessed by system B, while the infrastructure at the local side may further comprises means for processing HTTP requests received from system A to identify an application X to be accessed by system B.

To further improve the protection of the remote side, its infrastructure means may further include means for defining all operations allowed by system A when processing an application request from system B in a definition and means for allowing or denying any operation required by an application request from system B based on the definition. Additionally, the infrastructure means on the remote side as well as on the local side may comprise means to encrypt HTTP communication between system A and system B.

DETAILED DESCRIPTION

The present invention relates generally to accessing remote applications and more particularly to accessing a remote application running on a system A by a system B, where each of the systems A and B are connected to an open network and located behind a firewall. The following description is presented to enable one of ordinary skill in the art to make and use the invention as is provided in the context of a patent application and its requirements. Various modifications to the preferred implementations and the generic principles and features described herein will be readily apparent to those skilled in the art. Thus, the present invention is not intended to be limited to the implementation shown, but is to be accorded the widest scope consistent with the principles and features described herein.

Figure 1:
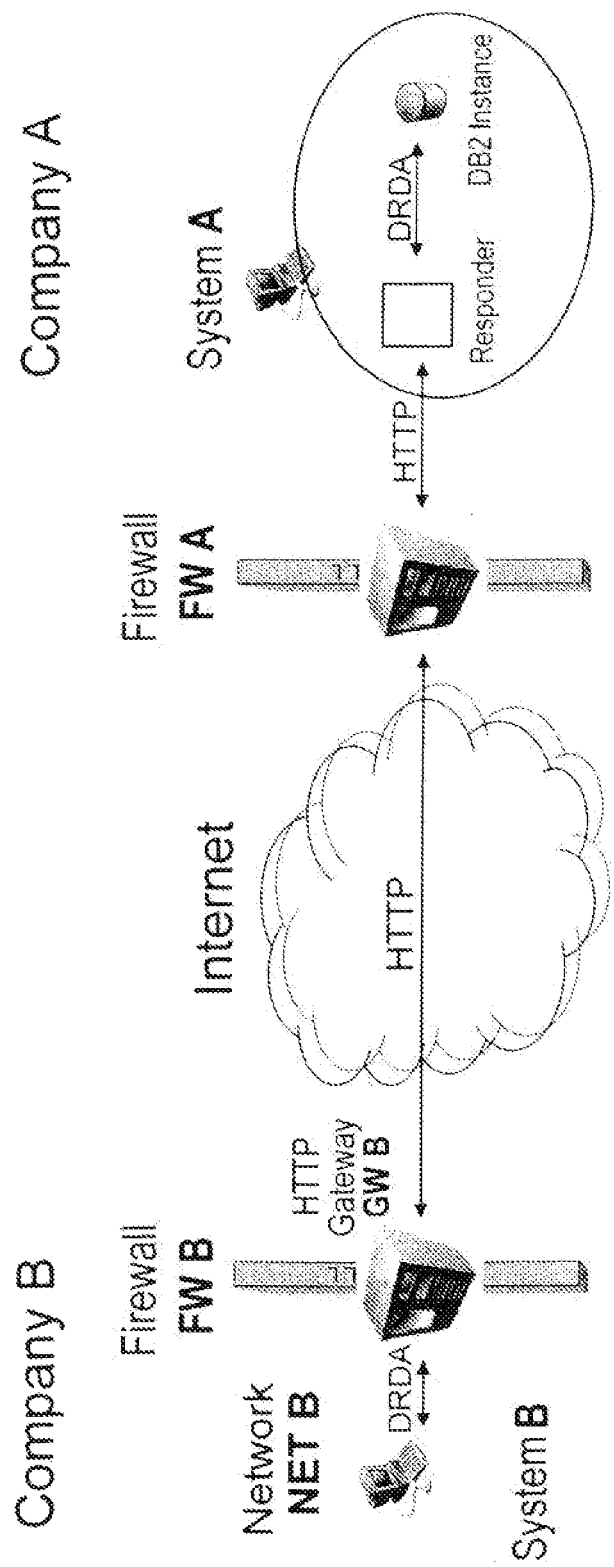
FIG. 1 illustrates the circumstances and infrastructure of a remote access according to an embodiment of the present invention.

In the example shown in FIG. 1, a company B is a service provider for a relational database (e.g., an IBM® DB2 Universal Database) running on a server (e.g., an IBM® DB2 Server) at a company A. The invention is used for monitoring the remote server at a company A, which is referred to as a DB2 instance in FIG. 1. Company B includes a network NET B with a system B that is connected to an open network, e.g., the Internet illustrated in FIG. 1, but separated from the open network by a firewall FW B, which comprises a HyperText Transfer Protocol (HTTP) gateway GW B. In the same way, company A includes a system A connected to the open network and located behind a firewall FW A.

On the customer's (i.e., company A) side, there is implemented a special reverse responder. In one implementation, the responder comprises means for sending HTTP requests from system A to system B via the open network, means for receiving HTTP responses from system B to system A via the open network, means for processing HTTP responses from system B to extract application requests and to forward the application requests to system A, means for generating HTTP requests specifying an application X to be accessed by system B, and means for generating HTTP requests comprising application responses generated by system A.

If the customer needs the service provider's (i.e., company B) support concerning, for example, the DB2 instance, the customer can open a corresponding problem ticket using the responder. Therewith, the customer can generate an initiating HTTP request specifying the DB2 instance and send the initiating HTTP request via an optional HTTP proxy over the open network to GW B.

In one embodiment, the infrastructure on the service provider's side at GW B comprises means for receiving HTTP requests from system A to system B via the open network, means for sending HTTP requests from system A to system B via the open network, means for listening for application requests from system B concerning applications running on system A, means for blocking HTTP requests from system A to system B till an appropriate application request is available at system B, means for generating HTTP responses comprising application requests from system B, and means for processing HTTP requests received from system A to identify an application X to be accessed by system B, to extract application responses, and forward the application responses to system B.

In the described example, system B on network NET B of company B includes a performance server, such as an IBM® DB2 Performance Expert (PE) server, which is operable to collect performance information from a remote server, such as the DB2 instance on system A. The HTTP gateway GW B and the responder component of system A allow the DB2 PE server on system B and the DB2 instance on system A to communicate via the Distributed Relational Database Architecture (DRDA) protocol, which was standardized by the Open Group in 1998. When there is a connection between the DB2 PE server and the remote DB2 instance, the DB2 PE server can issue special SQL statements together with an application request. These SQL statements invoke table functions, such as DB2 snapshot table functions, which are user defined functions that may be running on the DB2 instance of system A and used to retrieve performance data relating to the DB2 instance and to store the performance data into a plurality of tables.

An application response can then be generated by accessing the performance information in the plurality of tables. The HTTP gateway GW B and the responder component can tunnel each DRDA request from the DB2 PE server and each DRDA response from the DB2 instance, which will be described in connection with FIG. 2.

The DB2 PE server can retrieve performance data from the DB2 instance in a background mode at regular intervals to keep a history about previous performance constraints. Another possibility is to retrieve performance data on request. In one implementation, network NET B further comprises an IBM® DB2 Performance Expert (PE) client that is used as a graphical user interface for the DB2 PE server. The DB2 PE client may reside on system B or another system (not shown) in NET B of company B. The DB2 PE client is able to visualize and analyze the DB2 performance data, which is collected and prepared by the DB2 PE server.

GW B is able to process the customer's initiating HTTP request and to extract the information relating to, for instance, a relational database running on the customer's system A, which is to be accessed by the service provider's system B. Additionally, GW B can listen for application requests coming from system B concerning the relational database running on system A. According to an embodiment of the invention, GW B blocks the initiating HTTP request from system A till an appropriate request from system B is available for transfer. Then, GW B uses an HTTP response to send the overlaying request to the responder at the customer's side via the open network.

The responder will process the HTTP response from system B and is able to extract the service provider's request from the HTTP response to forward the request to system A. A response comprising all information requested by system B can then be generated by system A.

According to the embodiment of the invention, the response will be transferred to the service provider's system B via the open network with the help of another HTTP request sent from the customer. Therefore, the responder will generate an HTTP request comprising the response of system A and will send this HTTP request to GW B of system B. Once received, the HTTP request is processed to extract the response, which is then sent to system B.

To continue this kind of communication between the customer (i.e., company A) and the service provider (i.e., company B), this last HTTP request from system A is again blocked. Thus, it is available for the service provider's next request.

The privacy of operations executed by the service provider on the customer's system A can be ensured by encrypting the HTTP communication using, for example, the source socket layer (SSL) protocol. In addition, the customer invoking the responder can restrict the set of operations allowed for remote access by passing corresponding information to the program during start-up. Thus, the responder can allow or deny special operations, such as DB2 protocol operations, on the customer's request.

However, the invention is not limited to limiting the number of allowed operations for the DB2 protocol only. The responder can limit the allowed operations, depending on the accessed application.

Further, any communication between the service provider and the customer must be initiated by both sides. The HTTP gateway GW B on the service provider's side must listen for incoming HTTP requests and the responder on the customer's side must be started. Hence, the user of the responder is always in full control of the communication because the communication will stop if the responder is stopped.

The example described above illustrates that the customer has at least two additional possibilities to stop the communication with the service provider. First, after having received an application request from the service provider, the customer can refuse to generate an application response or to transfer an application response already generated back to the service provider. Consequently, the service provider will not receive any further HTTP requests which are necessary for sending further application requests to the customer. Second, the customer can send a special HTTP request to the service provider comprising information that the communication should be terminated.

Figure 2:
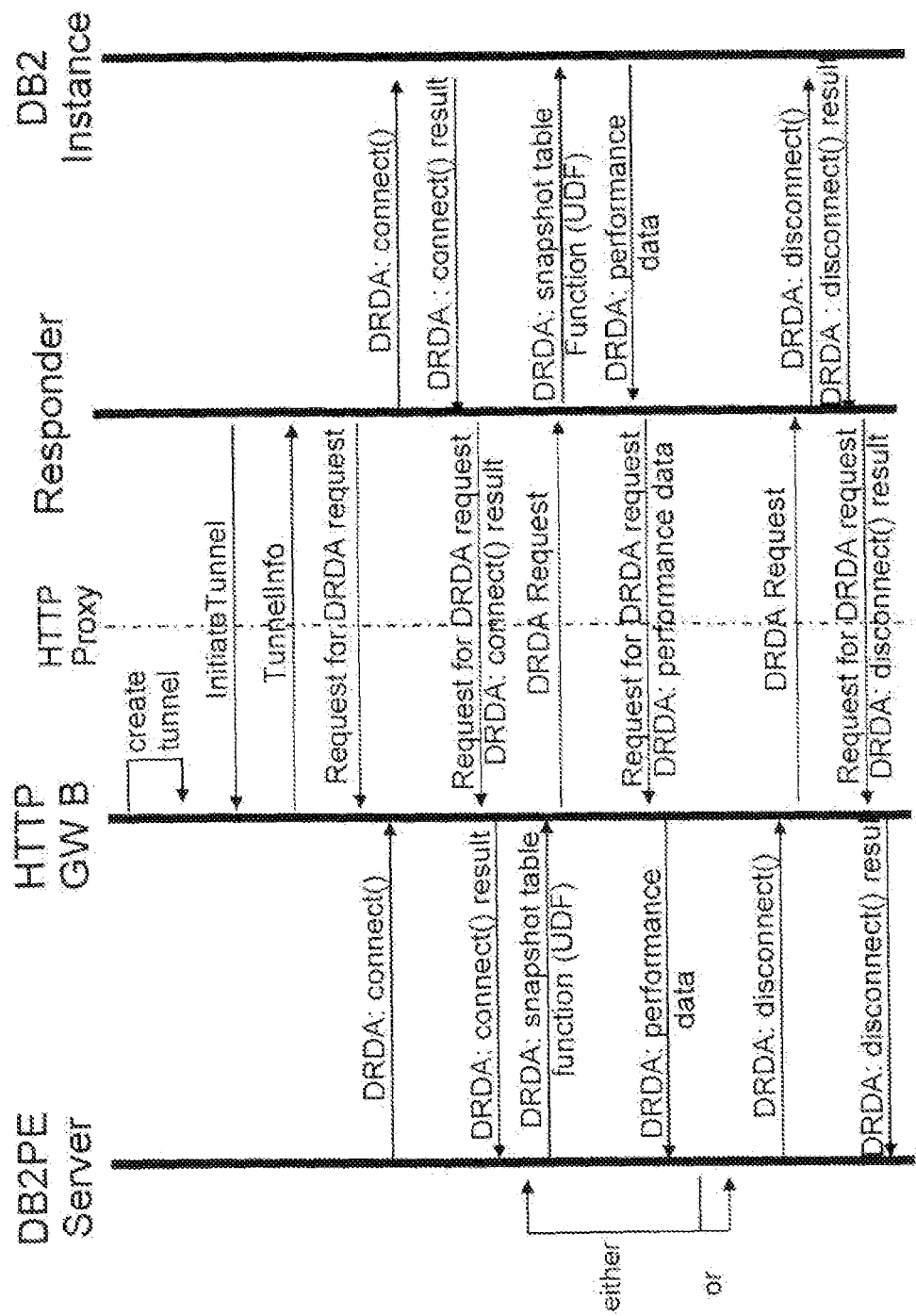
FIG. 2 illustrates the exchange of information between a remote side and a local side by performing a remote access according to an implementation of the present invention.

The diagram of FIG. 2 illustrates the exchange of information between the service provider's side and the customer's side for the example described in connection with FIG. 1. In FIG. 2, the open network is located between the HTTP gateway GW B and typically an HTTP Proxy inside firewall FW A, which forwards request from systems behind the firewall into the open network. The service provider's DB2 PE Server is located behind HTTP gateway GW B in the firewall FW B of system B. Here, the responder is located in the customer's firewall FW A, which separates system A from the open network.

First, a tunnel for HTTP communication between system A and system B is created. Then, the communication between the customer and the service provider is initiated by a first "Request for DRDA request" from the responder on the customer's side to the GW B on the service provider's side. This first "Request for DRDA request" is blocked until GW B receives a request "DRDA: connect( )" from the DB2 PE server. In response to the first "Request for DRDA request," the "DRDA: connect( )" request is transmitted back to the DB2 PE server via the HTTP Proxy together with another "Request for DRDA request."

If the initial "shake hands" is successful, i.e., the connection could be built up, the DB2 PE server issues a DB2 request "DRDA: snapshot table function (UDF)" comprising a SQL statement for invoking DB2 snapshot table functions on the customer's side. The resultant "DRDA Request" is then transmitted in response to the preceding "Request for DRDA request" via the HTTP proxy to the responder and the DB2 instance. There, the "DRDA Request" will be processed to extract and execute the DB2 request, especially the corresponding DB2 snapshot table functions.

The resultant DB2 performance data is sent back to the responder, where another "Request for DRDA request" is generated comprising the DB2 performance data. Then, the "Request for DRDA request" is transmitted from the responder via the HTTP Proxy to GW B, where the DB2 performance data is extracted and sent to the DB2 PE server.

If the initial "shake hands" is not successful, the DB2 PE server issues a DB2 request "DRDA: disconnect( )" to terminate the process of connection. GW B transmits a corresponding "DRDA Request" via the HTTP proxy to the responder as response for the preceding "Request for DRDA request." The responder extracts the request "DRDA: disconnect( )" and sends it to the DB2 instance where the process of connection is abandoned and the result "DRDA: disconnect( ) result" is sent back to the responder. There, another "Request for DRDA request" is transmitted from the responder via the HTTP Proxy to GW B, where the result "DRDA: disconnect( ) result" is extracted and sent to the DB2 PE server.

From the perspective of system B, it is connecting to a remote DB2 server on GW B, as GW B and the responder will make the remote connection invisible from system B. From the perspective of system A, a DB2 client in the local network is connecting to the DB2 server and executing requests.

While the present invention has been described with reference to the above embodiments, the technical scope of the present invention is not limited thereto. It is to be understood by those skilled in the art that various modifications or improvements can be added to the above embodiments. It is apparent from the appended claims that such modified or improved implementation fall within the technical scope of the present invention.

What is claimed is:

1. A method comprising:
sending, from a first hardware system that executes an application, a first HTTP request to a second hardware system via an open network, the first hardware system being located behind a first secure firewall, the second hardware system being located behind a second secure firewall;
receiving, at the first hardware system, an HTTP response having an application request from the second hardware system;
processing, at the first hardware system, the application request received from the second hardware system to generate an application response that includes an allowance of access that is determined by the first hardware system, the allowance of access providing secure remote access of the application to the second hardware system without having to open an additional port through the first secure firewall; and
sending, from the first hardware system, a second HTTP request to the second hardware system, the second HTTP request including the application response.

2. The method of claim 1, wherein the application request is from a performance server running on the second hardware system seeking to monitor performance of a remote server running on the first hardware system, wherein the application request comprises structured query language statements that invoke one or more snapshot table functions of the remote server, wherein a Distributed Relational Database Architecture protocol is used for communication between the performance server running on the second hardware system and the remote server running on the first hardware system, and wherein processing the application request comprises:
performing the table functions using the structured query language statements in the application request, the table functions retrieving performance data relating to the remote server and storing the performance data into a plurality of tables; and
accessing the plurality of tables to generate the application response.

3. The method of claim 2, wherein the performance server is accessing the remote server based on a request from a client connected to the performance server.

4. The method of claim 2, wherein the performance server is accessing the remote server in a background mode at regular intervals.

5. The method of claim 1, wherein the application request specifies the application.

6. The method of claim 1, wherein the allowance of access is based on predefined operations to be allowed by the first hardware system.

7. The method of claim 1, wherein HTTP communication between the first hardware system and the second hardware system is encrypted.

8. The method of claim 1, wherein the application request comprises at least one of a request by the second hardware system to monitor the application running on the first hardware system, a request to analyze performance of the application running on the first hardware system, and a request to collect information relating to configuration and workload of the application running on the first hardware system.

9. A computer program product comprising a computer readable hardware program storage medium, the computer readable hardware program storage medium including a computer readable program comprising program instructions to:
send, from a first hardware system that executes an application, a first HTTP request to a second hardware system via an open network, the first hardware system being located behind a first secure firewall, the second hardware system being located behind a second secure firewall;
receive, at the first hardware system, an HTTP response having an application request from the second hardware system;
process, at the first hardware system, the application request received from the second hardware system to generate an application response that includes an allowance of access that is determined by the first hardware system, the allowance of access providing secure remote access of the application to the second hardware system without having to open an additional port through the first secure firewall; and
send, from the first hardware system, a second HTTP request to the second hardware system, the second HTTP request including the application response.

10. The computer program product of claim 9, wherein the application request is from a performance server running on the second hardware system seeking to monitor performance of a remote server running on the first hardware system, wherein the application request comprises structured query language statements that invoke one or more snapshot table functions of the remote server, wherein a Distributed Relational Database Architecture protocol is used for communication between the performance server running on the second hardware system and the remote server running on the first hardware system, and wherein processing the application request comprises:
performing the table functions using the structured query language statements in the application request, the table functions retrieving performance data relating to the remote server and storing the performance data into a plurality of tables; and
accessing the plurality of tables to generate the application response.

11. The computer program product of claim 10, wherein the performance server is accessing the remote server based on a request from a client connected to the performance server.

12. The computer program product of claim 10, wherein the performance server is accessing the remote server in a background mode at regular intervals.

13. The computer program product of claim 9, wherein the application request specifies the application.

14. The computer program product of claim 9, wherein the allowance of access is based on predefined operations to be allowed by the first hardware system.

15. The computer program product of claim 9, wherein HTTP communication between the first hardware system and the second hardware system is encrypted.

16. The computer program product of claim 9, wherein the application request comprises at least one of a request by the second hardware system to monitor the application running on the first hardware system, a request to analyze performance of the application running on the first hardware system, and a request to collect information relating to configuration and workload of the application running on the first hardware system.

17. A method comprising:
receiving, from a first hardware system that executes an application at a second hardware system, a first HTTP request via an open network, the first hardware system being located behind a first secure firewall, the second hardware system being located behind a second secure firewall;
sending, from the second hardware system, an HTTP response having an application request to the first hardware system so that the application request is processed at the first hardware system to generate an application response that includes an allowance of access that is determined by the first hardware system, the allowance of access providing secure remote access of the application to the second hardware system without having to open an additional port through the first secure firewall; and
receiving, from the first hardware system at the second hardware system, a second HTTP request, the second HTTP request including the application response.

18. The method of claim 17, wherein the application request specifies the application.

19. The method of claim 17, wherein the allowance of access is based on predefined operations to be allowed by the first hardware system.

20. The method of claim 17, wherein HTTP communication between the first hardware system and the second hardware system is encrypted.

21. The method of claim 17, wherein the application request comprises at least one of a request by the second hardware system to monitor the application running on the first hardware system, a request to analyze performance of the application running on the first hardware system, and a request to collect information relating to configuration and workload of the application running on the first hardware system.

22. The method of claim 17, wherein the application request is from a performance server running on the second hardware system seeking to monitor performance of a remote server running on the first hardware system, wherein the application request comprises structured query language statements that invoke one or more snapshot table functions of the remote server, wherein a Distributed Relational Database Architecture protocol is used for communication between the performance server running on the second hardware system and the remote server running on the first hardware system.

23. A hardware system located behing a secure firewall comprising:
means for executing an application;
means for sending a first HTTP request to an additional hardware system via an open network, the additional hardware system being located behind a second secure firewall;
means for receiving an HTTP response having an application request from the additional hardware system;
means for processing the application request received from the additional hardware system to generate an application response that includes an allowance of access and determining an allowance of access, the allowance of access providing secure remote access of the application to the additional hardware system without having to open an additional port through the secure firewall; and
means for sending a second HTTP request to the additional hardware system, the additional HTTP request including the application response.

24. The hardware system of claim 23, wherein the application request specifies the application.

25. The hardware system of claim 23, wherein the allowance of access is based on predefined operations.

26. The hardware system of claim 23, wherein HTTP communication is encrypted.

27. The hardware system of claim 23, wherein the application request comprises at least one of a request by the additional hardware system to monitor the application, a request to analyze performance of the application, and a request to collect information relating to configuration and workload of the application.

28. The hardware system of claim 23, wherein the application request is from a performance server running on the additional hardware system seeking to monitor performance of a remote server, wherein the application request comprises structured query language statements that invoke one or more snapshot table functions of the remote server, wherein a Distributed Relational Database Architecture protocol is used for communication between the performance server running on the additional hardware system and the remote server, and wherein processing the application request comprises:
performing the table functions using the structured query language statements in the application request, the table functions retrieving performance data relating to the remote server and storing the performance data into a plurality of tables; and
accessing the plurality of tables to generate the application response.

29. The hardware system of claim 23, wherein the performance server is accessing the remote server based on a request from a client connected to the performance server.

30. The hardware system of claim 23, wherein the performance server is accessing the remote server in a background mode at regular intervals.

31. A computer program product comprising a computer readable hardware program storage medium, the computer readable hardware program storage medium including a computer readable program comprising program instructions to:
receive, from a first hardware system that executes an application at a second hardware system, a first HTTP request via an open network, the first hardware system being located behind a first secure firewall, the second hardware system being located behind a second secure firewall;
send, from the second hardware system, an HTTP response having an application request to the first hardware system so that the application request is processed at the first hardware system to generate an application response that includes an allowance of access that is determined by the first hardware system, the allowance of access providing secure remote access of the application to the second hardware system without having to open an additional port through the first secure firewall; and
receive, from the first hardware system at the second hardware system, a second HTTP request, the second HTTP request including the application response.

32. The computer program product of claim 31, wherein the application request specifies the application.

33. The computer program product of claim 31, wherein the allowance of access is based on predefined operations to be allowed by the first hardware system.

34. A hardware system located behind a secure firewall comprising:
means for receiving, from an additional hardware system that executes an application at the additional hardware system, a first HTTP request via an open network, the additional hardware system being located behind an additional secure firewall;

means for sending an HTTP response having an application request to the additional hardware system so that the application request is processed at the additional hardware system to generate an application response that includes an allowance of access that is determined by the additional hardware system, the allowance of access providing secure remote access of the application without having to open an additional port through the additional secure firewall; and means for receiving, from the additional hardware system, a second HTTP request, the second HTTP request including the application response.

35. The hardware system of claim 34, wherein the application request specifies the application.

* * * * *